No. 634,501. Patented Oct. 10, 1899.
T. E. MANNEY.
TIRE FOR BICYCLES OR OTHER VEHICLES.
(Application filed Oct. 20, 1897.)
(No Model.)
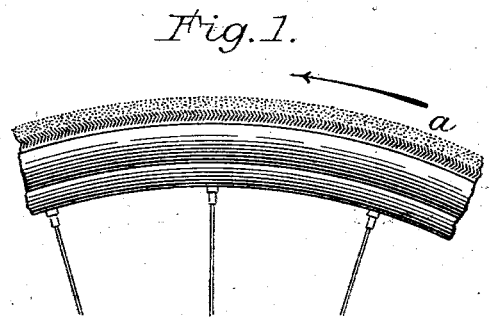
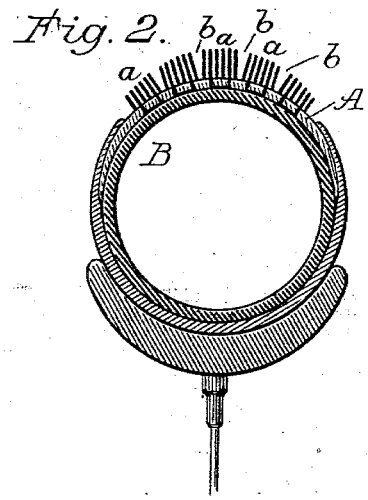
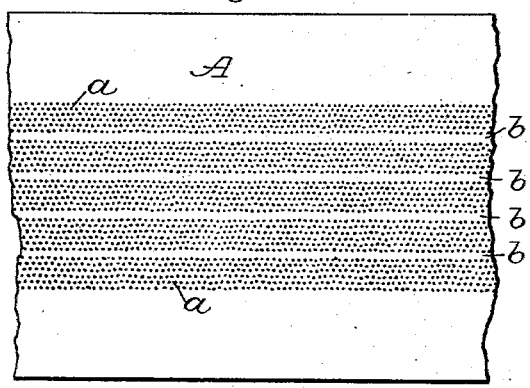
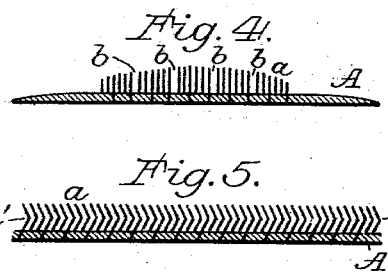
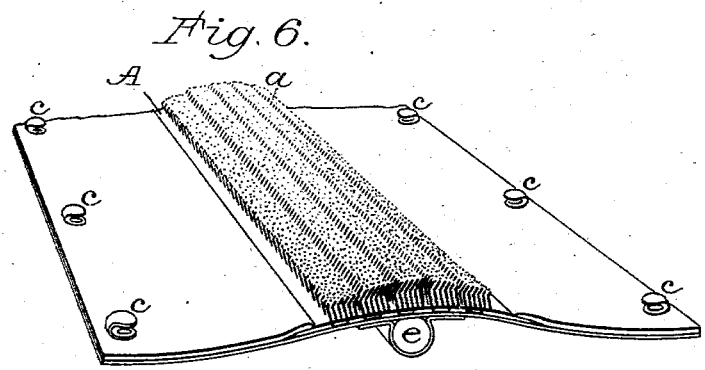
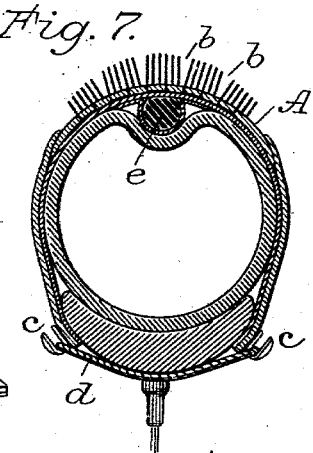
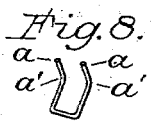
Attest:
Howell Bartt
J. W. Searle
Inventor:
Thomas Edward Manney
By Wm. C. Wood
Attorney
THE NORRIS PETERS CO., PHOTO-LITHO., WASHINGTON, D. C.

UNITED STATES PATENT OFFICE.

THOMAS EDWARD MANNEY, OF PROVIDENCE, RHODE ISLAND.

TIRE FOR BICYCLES OR OTHER VEHICLES.

SPECIFICATION forming part of Letters Patent No. 634,501, dated October 10, 1899.

Application filed October 20, 1897. Serial No. 655,765. (No model.)

*To all whom it may concern:*

Be it known that I, THOMAS EDWARD MANNEY, a citizen of the United States, residing at Providence, in the county of Providence and State of Rhode Island, have invented certain new and useful Improvements in Tires for Bicycles or Similar Vehicles; and I do hereby declare that the following specification, taken in connection with the drawings furnished and forming a part thereof, is a clear, true, and complete description of my invention.

For indicating the status of my improvements with relation to the art I will first state that various forms of bicycle-tires and attachments have heretofore been devised with a view to securing comparatively safe and rapid riding on ice and other slippery surfaces, and some of said attachments have been specially adapted for use as protective jackets to pneumatic tires with a further view of lessening the liability of puncture. In most cases reliance has been had upon rigid sharp-pointed studs or spurs projecting radially, and these have been variously organized with foundations adapted to be detachably applied as jackets for either solid or tubular tires, and as said spurs are short, rigid, and radial they have no resiliency, and each spur to be effective is capable of sustaining the weight carried by the wheel while passing over a surface which the spur could not penetrate. Instead of having spurs some protecting tire-jackets have been composed either of woven-wire cloth or of peripheral spiral coils interlocked laterally, with the intent of having a tread-surface which would become so compacted under a load as to greatly protect a pneumatic tire from being punctured and yet present a surface sufficiently rough, corrugated, or channeled to partially overcome the liability of slipping laterally and circumferentially. There have also been devised several embodiments of spring-teeth which project from the periphery of the rim and operate as the tread-surfaces of the wheel, the rim or tire of which, as well as said springs, are practically portions of the wheel. These tire-springs operate in cushioning a vehicle while passing over rough surfaces, and each spring-tooth has and must have sufficient strength to sustain that portion of the weight which is to be carried by the wheel of which the spring-tooth is a part, and while such spring-teeth must to some extent obviate liability of slipping on icy surfaces they cannot be practically effective for that purpose because their free ends or tips are intentionally carried inward toward the center of the wheel when the springs are bearing a load, and hence said tips cannot engage and prevent slipping thereon either laterally or in the line of travel. I will also state that the rigid rims of velocipede-wheels have heretofore been clad with bristles in such a manner as to prevent the wheel from adhering to the ground.

The main object of my invention is to provide in a wheel-tire a metallic tread-surface which will not only reliably engage with smooth and slippery traveled surfaces but will resiliently conform to rough but icy surfaces and also be specially desirable when traveling on concrete pavements or exercising upon smooth wooden floors and even suited for desirable use upon ordinary rough roads. For accomplishing these ends I have devised a tire the tread-surface of which is composed of the ends or tips of numerous short flexible wires massed in appropriate arrangement and mounted in a suitable flexible foundation after the manner of a brush, the whole being either incorporated with or as an integral part of an elastic or resilient tire, whether solid or tubular or adapted to be detachably applied as a jacket to such elastic tires or even to such metallic rims as are used on the wheels of children's tricycles and velocipedes, in which latter case the resiliency of the tire itself will afford comparatively easy riding while moving over and effectually engaging with rough icy surfaces.

It will now be understood that in my tires the tips of the wires operate in mass, no one of the tips operating by itself, the wire being too flexible and delicate for enabling it to separately support a loaded wheel or prevent its slipping, whereas with the spurs or studs and springs as heretofore employed each is capable of operating independently of the others in engaging with a traveled surface and in supporting the wheel and its load.

With the bristle-clad wheels heretofore referred to no effective adherence or holding contact, either with icy surfaces or with wet concrete, could be secured, and even if bristles should be mounted in flexible foundations (as is essential with the wires in my tires) the bristles under pressure would either lie flatly or be doubled on themselves, instead of presenting their ends or tips to the traveled surface, as is the case with my flexible wires.

To more particularly describe my invention, I will refer to the accompanying drawings, in which—

Figure 1 illustrates in side view a portion of a wheel having one of my tires as permanently applied to a tubular tire, an arrow indicating the direction in which the wheel should move for securing the best results. Fig. 2 illustrates in an enlarged cross-section the outer portion of the wheel. Figs. 3, 4, and 5 illustrate a portion on one of my tires, respectively, in top view, cross-section, and longitudinal section, the tire being thus formed prior to its incorporation with a tubular tire, as in Fig. 2. Fig. 6 illustrates in perspective a portion of one of my tires specially adapted for use as a detachable jacket for a tubular or pneumatic tire. Fig. 7 illustrates in cross-section the rim of a wheel, a tubular tire, and the detachable tire of Fig. 6 applied thereto, as for use. Fig. 8 illustrates a detached pair of my tire-wires in their best form.

In view of the facility with which pneumatic tires may be applied to and detached from their wheels the permanent combination of my tire with the pneumatic tire constitutes a very desirable embodiment of my invention, as many persons would much prefer to shift tires than to apply the detachable form or jacket-tire.

In Figs. 3 to 5, inclusive, I have shown my tire as prepared with its mass of wires prior to its application to the main or tubular tire. The foundation A in this instance should be composed of a strong inelastic textile fabric well charged with a vulcanizable rubber compound, so that when applied to and bound upon the main tube B by a similar fabric the whole will when vulcanized constitute a practically integral tubular mass. The numerous small, short, and flexible wires $a$ may be hard brass, but are preferably composed of fine hard iron or of steel and in some cases electroplated with either nickel or copper for obviating undue corrosion. Each wire has an angular bend, as at $a'$, and in their best form they are in pairs, as best shown in Fig. 8, two being formed from an appropriate length of material with the base embedded in the foundation at its rear and so that the two wires will occupy different circumferential rows. In order that mud and other adhesive matter may be freely discharged while the wheel is in motion, the circumferential rows of wires are grouped as shown, preferably six rows in a group and the groups separated by circumferential clearance-spaces, as at $b$.

Taken as a whole the mass of wires is specially effective when their tips occupy offset positions in the circumferential rows and are in lateral diagonal rows.

The outer ends or tips of the wires are squarely presented at the periphery, so that when in contact with a traveled surface a considerable mass of said tips constitute the tread-surface and they will reliably engage with the traveled surface and effectually prevent both circumferential and lateral slipping.

When bearing a weight, the wires, being flexible and resilient and being embedded in a flexible and resilient foundation, yield in mass under pressure and promptly thereafter they resume their normal positions. For securing the best results in use the tire should be applied, as shown by the arrow in Fig. 1, so that when the tips of the wires are doing bearing duty they will tilt rearwardly and cause their tips to more effectually engage with the underlying traveled surface than would be the case if the tire were reversed in position on the wheel; but in this latter instance (as when used on a pilot-wheel) the wires would be quite as resilient and very effective in preventing lateral slipping, because in whatever direction the rolling pressure may be applied the tips of the wires will constitute the tread-surface of the tire. The wires in the central portion of the tires are of equal length, but they are gradually shortened at each side, so that before they are applied to a wheel they present a convex surface and when applied the short, and consequently stiffer, wires are located at the sides for duty during any ordinary canting or tilting of the wheel.

With the tire mounted on a wheel, as shown, it is equally effective on smooth level ice, on rough icy pavements, on wet slimy concrete, and on the smooth dry floors of halls and cycle-schools without defacing the floors. Although the wires preferred are very light and seemingly delicate, my tires have withstood long continued use under usual conditions of road, street, and weather without serious injury.

In Figs 6 and 7 I have illustrated my tire as specially adapted for use as a detachable jacket upon a wheel having a pneumatic tire. The foundation A and the wires $a$ are as already described, but these are here mounted upon a strong wide fabric, preferably provided with lacing-hooks $c$, so that the whole may be readily applied to a wheel by means of a lacing-cord $d$ similar to what has been heretofore practiced in securing tires having rigid radial studs and other forms of pneumatic-tire protectors. In this form of my tire, however, I employ an elastic or compressible rib $e$, located centrally at the rear of the foundation A, so that it will peripherally engage centrally with the pneumatic tire, which latter being slack when my tire is applied should then be fully inflated, so that the rib $e$ will then be well seated on and partially embraced by the pneumatic tire, and thereby afford a reliable seating of the jacket-tire.

Inasmuch as the gist of my invention consists in providing a tire with a tread-surface afforded by the tips or ends of a mass of short flexible wires, it will be obvious that no material departure from the main feature of my invention will be involved by variations in the character of the wires, if in mass their tips afford a resilient tread-surface, or in the character of the foundation, if the latter contributes to the resiliency of the tire—as, for instance, the foundation should always be composed at least in part of rubber for general out-of-door use, while suitable leather could be relied upon for use on either the concrete or wooden floors of a cycle-school. So, also, may the wires be variously arranged as to rows and spacing, although the arrangement particularly described has been found to be specially effective throughout extended tests and under widely-varied conditions.

Having thus described my invention, I claim as new—

1. A wheel-tire provided with a tread-surface composed of a mass of short flexible wires, appropriately arranged and mounted in a suitable flexible foundation, each wire having an angular bend the numerous wire tips or ends affording the bearing-surface of a wheel to which the tire may be applied, substantially as and for the purposes specified.

2. In a wheel-tire adapted for use as a jacket to a pneumatic tire, the combination of a suitable flexible foundation, means, (such as lacing hooks and cord) for securing it to a wheel, a mass of short flexible wires embedded in said foundation and presenting their tips or ends as a tread-surface, and a circumferential elastic rib at the rear of said foundation for engagement with the periphery of a pneumatic tire, substantially as described.

3. In a wheel-tire the combination with a suitable flexible foundation, of a mass of short flexible wires arranged in peripheral rows, and in pairs joined at their bases which are embedded in said foundation, and each wire having an angular bend, and presenting its tip or end to serve as a resilient portion of the tread-surface of the tire, substantially as described.

THOMAS EDWARD MANNEY.

Witnesses:
ARTHUR M. THOMPSON,
CLARENCE W. WOOD.